United States Patent
Tseng

(10) Patent No.: US 7,942,722 B2
(45) Date of Patent: May 17, 2011

(54) PRESSABLE AIR CUSHION CAPABLE OF BEING INFLATED AND BLED AND A BRASSIERE CUP WITH THE AIR CUSHION

(76) Inventor: Feng-Mao Tseng, Rende Township Tainan County (TW)

( * ) Notice: Subject to any disclaimer, the term of this patent is extended or adjusted under 35 U.S.C. 154(b) by 349 days.

(21) Appl. No.: 12/232,404

(22) Filed: Sep. 17, 2008

(65) Prior Publication Data

US 2010/0068973 A1 Mar. 18, 2010

(51) Int. Cl.
*A41C 3/00* (2006.01)

(52) U.S. Cl. ............................. 450/38; 450/54; 2/DIG. 3

(58) Field of Classification Search .................... 450/38, 450/54–58; 2/67, 22–24, 267, 268, DIG. 3; 137/223–225; 417/472, 454, 455, 435
See application file for complete search history.

(56) References Cited

U.S. PATENT DOCUMENTS

| | | | | |
|---|---|---|---|---|
| 76,894 A | * | 4/1868 | Cook | 450/38 |
| 2,741,769 A | * | 4/1956 | Philip | 450/38 |
| 2,826,202 A | * | 3/1958 | Sidney | 450/38 |
| 3,301,260 A | * | 1/1967 | Ray | 450/57 |
| 3,326,218 A | * | 6/1967 | McAlpine | 450/38 |
| 5,347,656 A | * | 9/1994 | Fabritz et al. | 2/67 |
| 5,833,515 A | * | 11/1998 | Shahbazian et al. | 450/38 |
| 6,058,507 A | * | 5/2000 | Klimenko | 2/67 |
| 6,080,037 A | * | 6/2000 | Lee et al. | 450/38 |
| 6,302,760 B1 | * | 10/2001 | Dai | 450/38 |
| 6,461,221 B1 | * | 10/2002 | Stilwell et al. | 450/57 |
| 6,796,875 B1 | * | 9/2004 | Placik | 450/1 |
| 6,859,948 B2 | * | 3/2005 | Melts | 2/465 |

\* cited by examiner

*Primary Examiner* — Gloria Hale
(74) *Attorney, Agent, or Firm* — Rosenberg, Klein & Lee

(57) ABSTRACT

A cup includes an air cushion, which has first and second plastic sheets, an elastic plate, a compressible component, and a third plastic sheet; the first sheet has an air inlet; the first and the second sheets are joined together to form an air receiving space between them; an air passage exists between the elastic plate and the first sheet to allow air to flow into the air space; the elastic plate has a displaceable portion, which can be disposed in a first direction to have a concave contour and allow the cushion to be inflated, and which can be disposed in an opposite direction to have a convex contour and allow the cushion to be bled; the compressible component is resilient and interposed between the air inlet and the displaceable portion, and can contain air therein; the third plastic sheet has a hole facing the displaceable portion, and an air outlet exists between the third plastic sheet and the elastic resilient plate.

11 Claims, 7 Drawing Sheets

PRESSABLE AIR CUSHION CAPABLE OF BEING INFLATED AND BLED AND A BRASSIERE CUP WITH THE AIR CUSHION

BACKGROUND OF THE INVENTION

1. Field of the Invention

The present invention relates to a pressable air cushion of a bra cup, more particularly one, which can be inflated and bled; the cup can be in such a shape as to cover a whole breast, a half or three-fourths of a breast; the air cushion has an elastic plate with a displaceable portion; the displaceable portion can be disposed in a first direction to have a concave contour and allow the cushion to be inflated, and which can be disposed in an opposite direction to have a convex contour and allow the cushion to be bled.

2. Brief Description of the Prior Art

Certain functional brassiere cups can lift, enlarge and massage the wearers' breasts and make them look perky. Such cups usually contain pads, air cushions or water bags.

The inventor of the present invention developed a brassiere cup, and filed a patent application based on this invention in Taiwan; the cup consists of inner and outer cotton layers, inner and outer foam layers, and an air cushion; the inner and the outer foam layers are positioned between the inner and the outer cotton layers, and the air cushion is completely covered with the inner and the outer foam layers. The air cushion consists of an inner plastic film, a plastic sheet, and an outer plastic film, which are joined together by means of heat-sealing. An air receiving space is formed between the inner plastic film and the plastic sheet, and there is an air passage communicating with that air receiving space. The air cushion includes a compressible component, which is held in the air receiving space. The inner plastic film has an air inlet, which faces the compressible component, and which is exposed through a through hole formed between the inner foam layer and the inner cotton layer. A waterproof film extends from the inner cotton layer to cover the through hole. The cup is found to have a drawback: after the cup is put on the wearer's breast, it will form raised lines on its surface to become unpleasant-looking if the air cushion is over-inflated. Consequently, the bra will spoil the contour of the wearer's breast.

Therefore, it is a main object of the present invention to provide an improvement on a brassiere cup to overcome the above problem.

SUMMARY OF THE INVENTION

A pressable air cushion of a brassiere cup in accordance with an embodiment of the present invention consists of first and second plastic sheets, an elastic plate, a compressible component, and a third plastic sheet. The first plastic sheet has an air inlet hole; the first and the second plastic sheets are joined together at their peripheries to form an air receiving space. The elastic plate is interposed between the first and the second plastic sheets, and has a displaceable portion capable of being moved to change shape between concave and convex contours; the elastic plate is joined at one end to the first plastic sheet with an air passage being formed between the elastic plate and the first plastic sheet to allow air to flow into the air receiving space. The compressible component is interposed between the air inlet hole of the first plastic sheet and the displaceable portion of the elastic plate. The third plastic sheet and the elastic plate are joined together at their peripheries with an air outlet hole being formed therebetween; the third plastic sheet has a through hole facing the displaceable portion of the elastic plate.

BRIEF DESCRIPTION OF THE DRAWINGS

The present invention will be better understood by referring to the accompanying drawings, wherein.

DETAILED DESCRIPTION OF THE PREFERRED EMBODIMENTS

Figure 1:
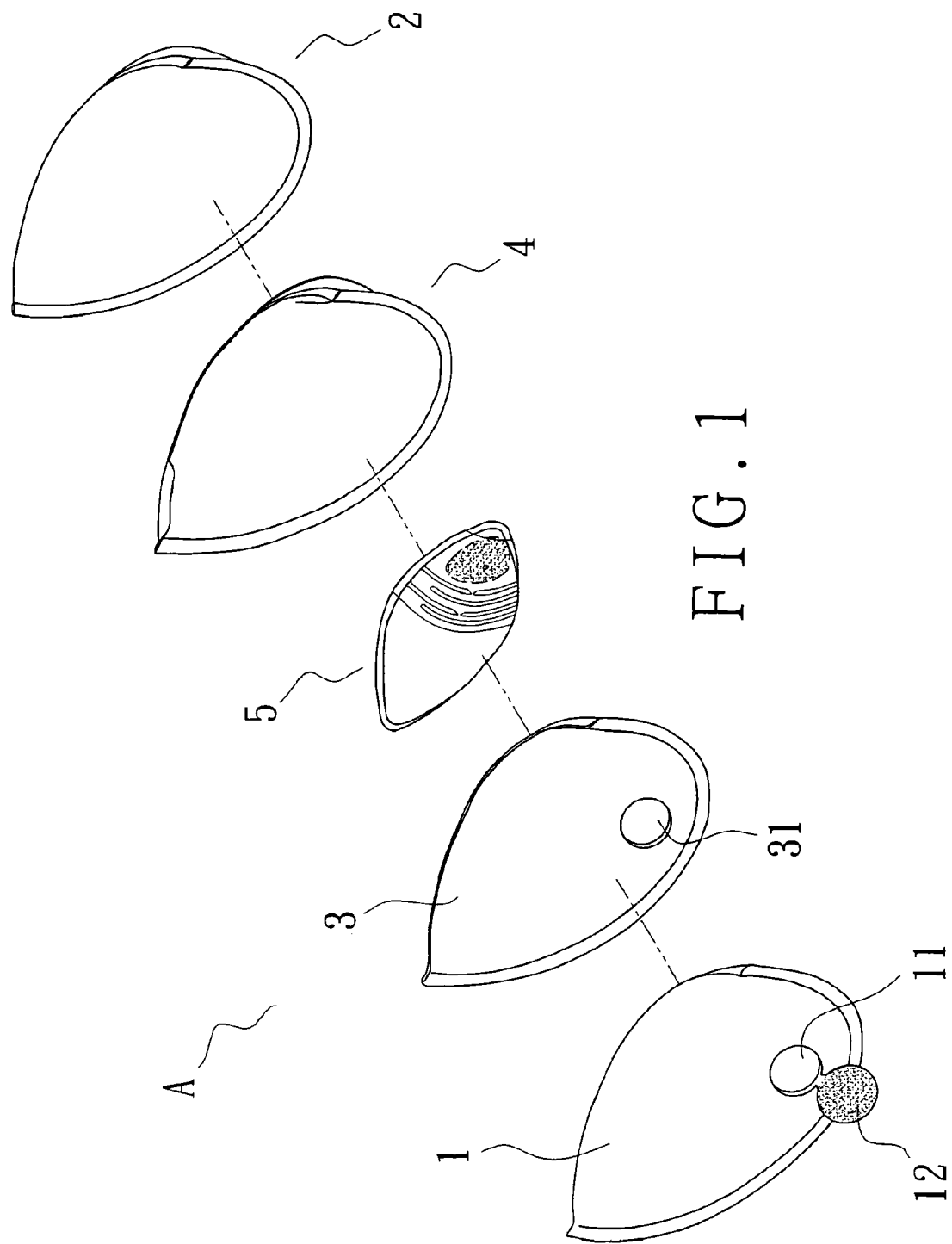
FIG. 1 is an exploded perspective view of the brassiere cup of the present invention.
Figure 2:
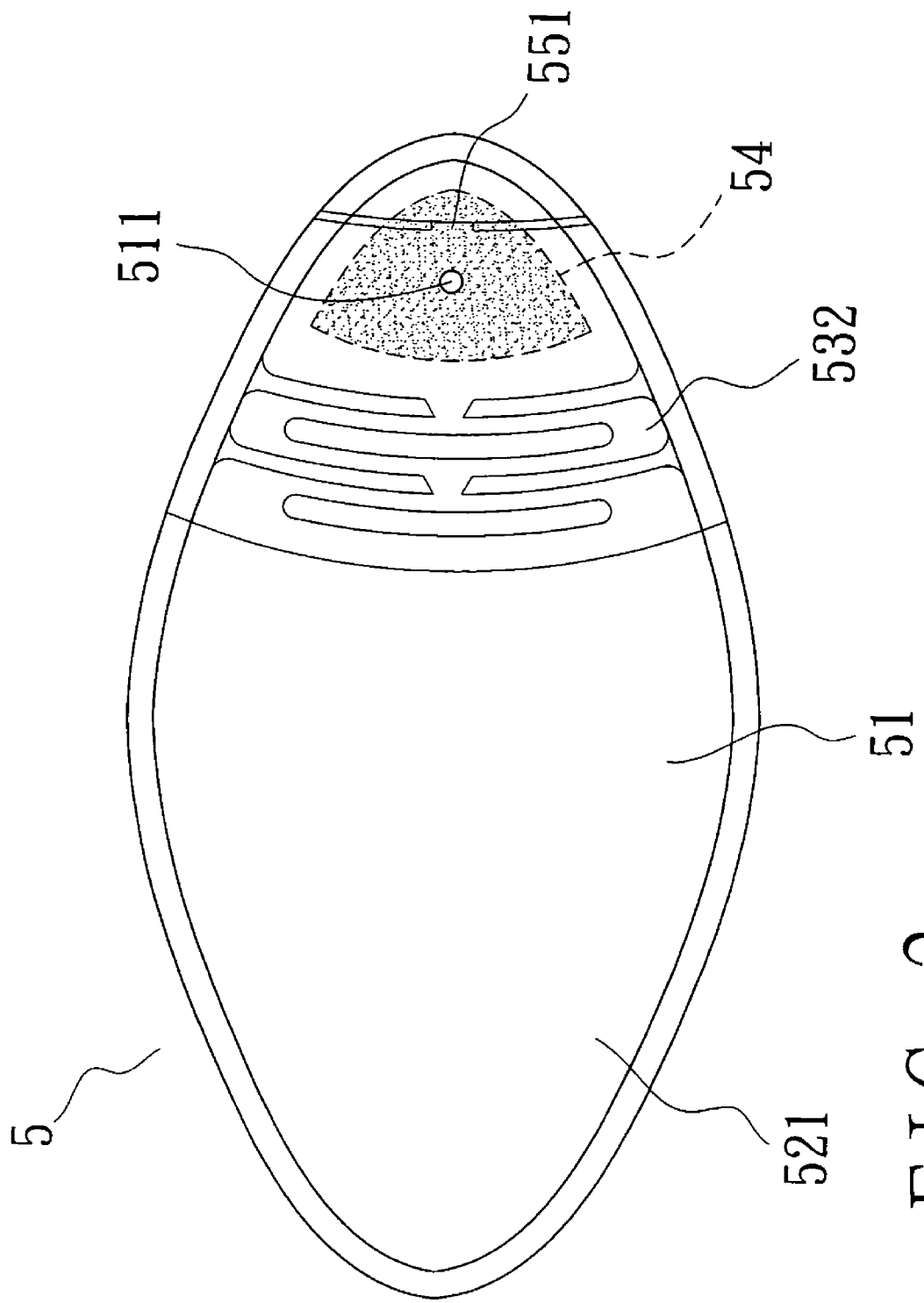
FIG. 2 is a front view of the air cushion of the present invention.
Figure 3:
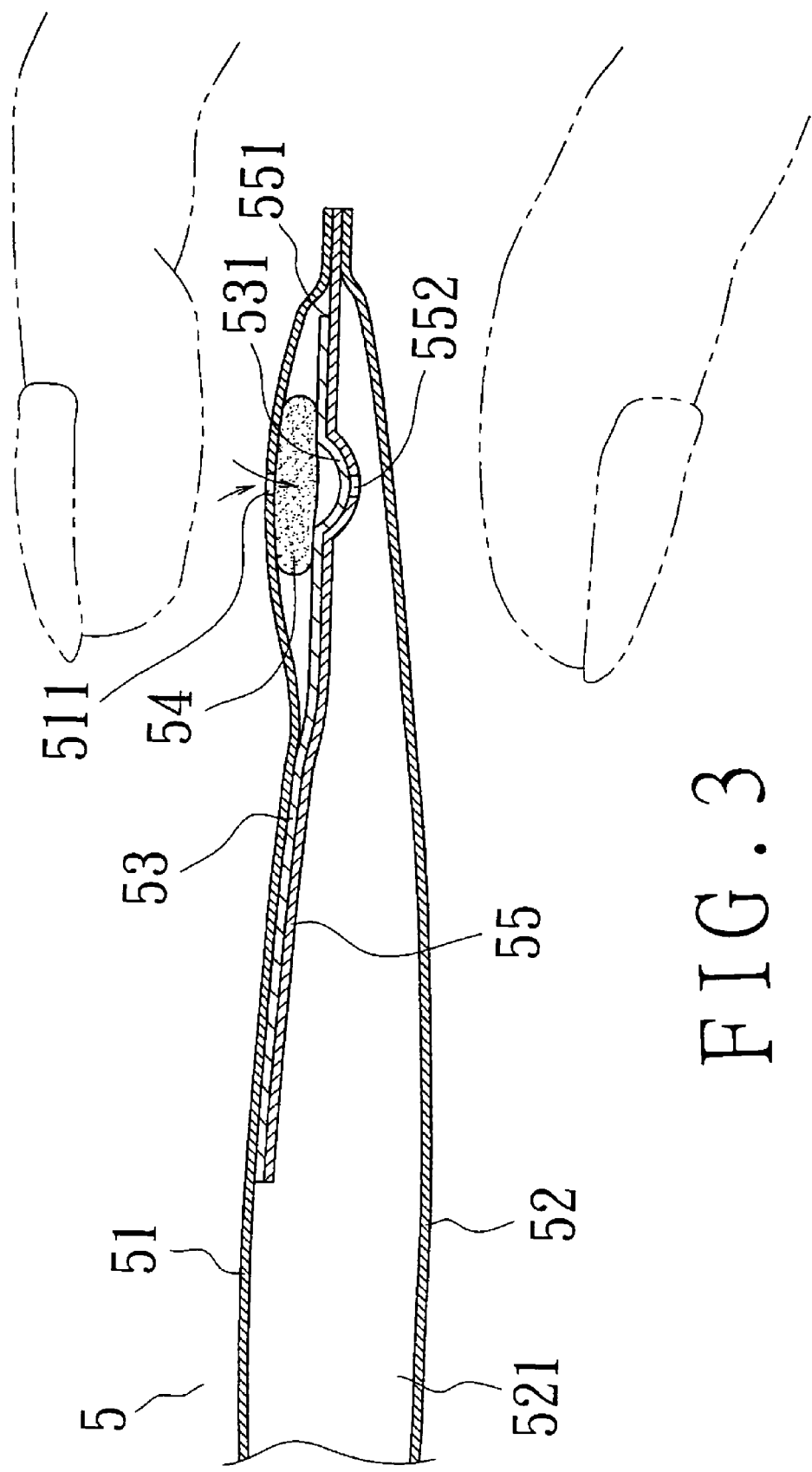
FIG. 3 is a view of the air cushion of the present invention under an inflating action (1)

Referring to FIG. 1 to FIG. 3, a preferred embodiment of a brassiere cup (A) of the present invention consists of:

an inner and an outer cotton layers 1 and 2; the inner cotton layer 1 has a through hole 11;

an inner and an outer foam layers 3 and 4 positioned between the inner and the outer cotton layers 1 and 2; the inner foam layer 3 has a through hole 31, which faces the through hole 11 of the inner cotton layer 1; and a pressable air cushion 5, which can be inflated and bled; the pressable air cushion 5 is positioned between and completely covered with the inner and the outer foam layers 3 and 4.

The pressable air cushion 5 consists of:

a first plastic film 51; the first plastic film 51 has an air inlet hole 511, which is exposed through the through holes 11 and 31 of the inner cotton layer and the inner foam layer 1 and 3;

a second plastic film 52; the first and the second plastic films 51 and 52 are stuck together at peripheries thereof so that an air room 521 is formed between the first and the second plastic films 51 and 52;

an elastic plate 53 interposed between the first and the second plastic sheets 51 and 52; the elastic plate 53 has a displaceable portion 531, which can change in direction and thereby change between concave and convex contours; the elastic plate 53 is joined at a first end thereof to the first plastic sheet 51 by heat-sealing so that an air passage 532 is formed between the elastic plate 53 and the first plastic sheet 51 to allow air to flow into the air receiving space 521 therethrough;

a compressible component 54 interposed between the air inlet hole 511 of the first plastic sheet 51 and the displaceable portion 531 of the elastic plate 53; the compressible component 54 is elastic and resilient, and it can be a sponge, a foam material, rubber or a material formed of elastic fibers; and a short plastic sheet 55; the third plastic sheet 55 is larger than the elastic plate 53; the third plastic sheet 55 and the elastic plate 53 are joined together at peripheries thereof with an air outlet hole 551 being formed between first ends thereof; the third plastic sheet 55 has a through hole 552 facing the displaceable portion 531 of the elastic plate 53.

The cup (A) can be in such a shape as to cover a whole breast, a half or three-fourths of a breast. Referring to FIGS.

1 and 3 to 5, in assembly, the air cushion 5 is positioned between and wrapped in the inner and the outer foam layers 3 and 4, and the inner and the outer foam layers 3 and 4 are positioned between and wrapped in the inner and the outer cotton layers 1 and 2 so that the air inlet hole 511 of the first plastic sheet 51 is exposed through the through holes 11 and 31 of the inner cotton layer 1 and the inner foam layer 3. And, an adhesive film 12 extends from an edge of the through hole 11 of the inner cotton layer 1 to cover the air inlet hole 511. Therefore, the displaceable portion 531 of the elastic plate 53 of the air cushion 5 faces upwards to receive the compressible component 54, and the third plastic sheet 55 is closely in contact with the other side of the displaceable portion 531; thus, the through hole 552 of the third plastic sheet 55 is blocked with the elastic plate 53.

Figure 4:
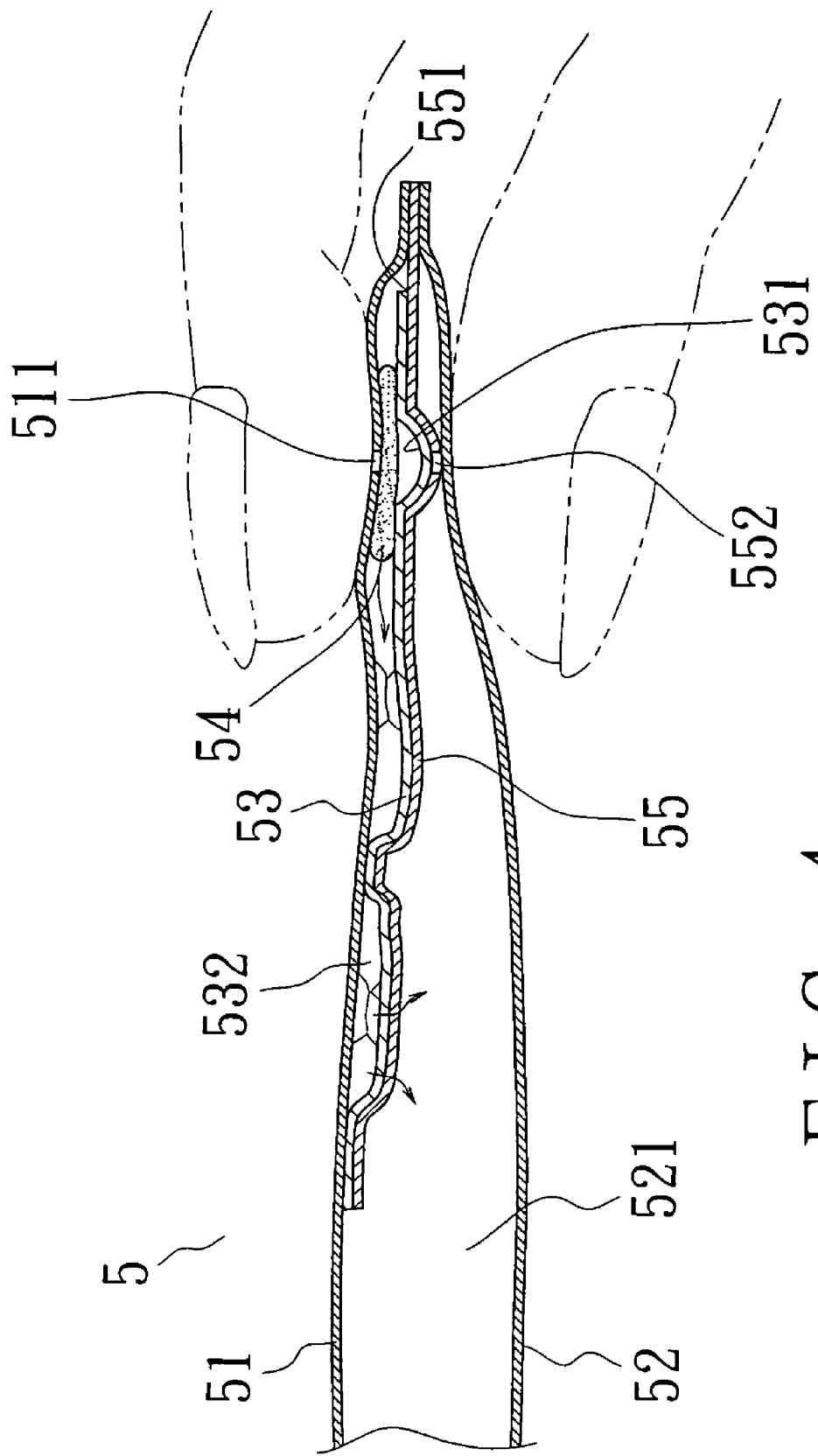
FIG. 4 is a view of the air cushion under an inflating action (2)
Figure 5:
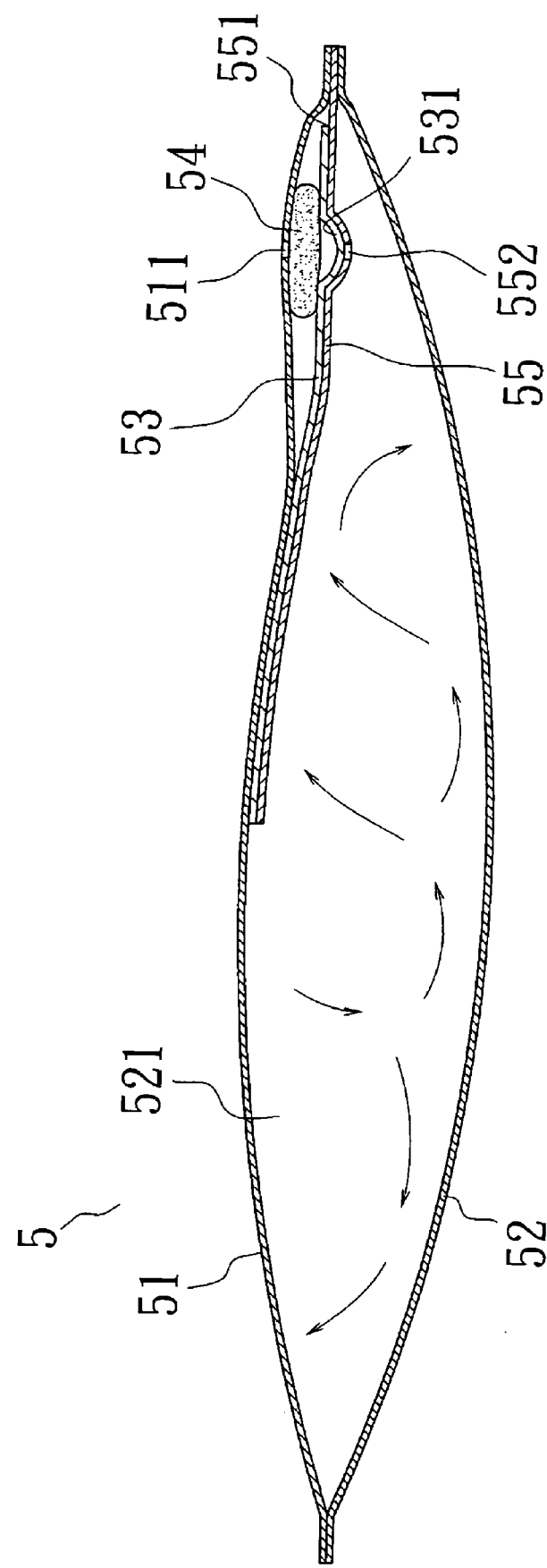
FIG. 5 is a view of the air cushion under an inflating action (3)

To inflate the air cushion 5, referring FIG. 3 to FIG. 5, first the user blocks the air inlet hole 511 of the first plastic sheet 51 with a finger after the resilient compressible component 54 is filled with air; thus, air can't flow out through the air inlet hole 511. Next, the user squeezes the resilient compressible component 54 repeatedly so that air in the compressible component 54 is forced to flow into the air receiving space 521 formed between the first and the second plastic sheets 51 and 52 through the air passage 532; thus, the air cushion 5 is inflated. Therefore, air pressure in the air receiving space 521 will make the first plastic sheet 51 and the elastic plate 53 be closely in contact with each other so as to block the air passage 532, and the air cushion 5 thereby can't leak. The cup (A) can lift the wearer's breast, and make it look perky owing to the air cushion 5.

Figure 6:
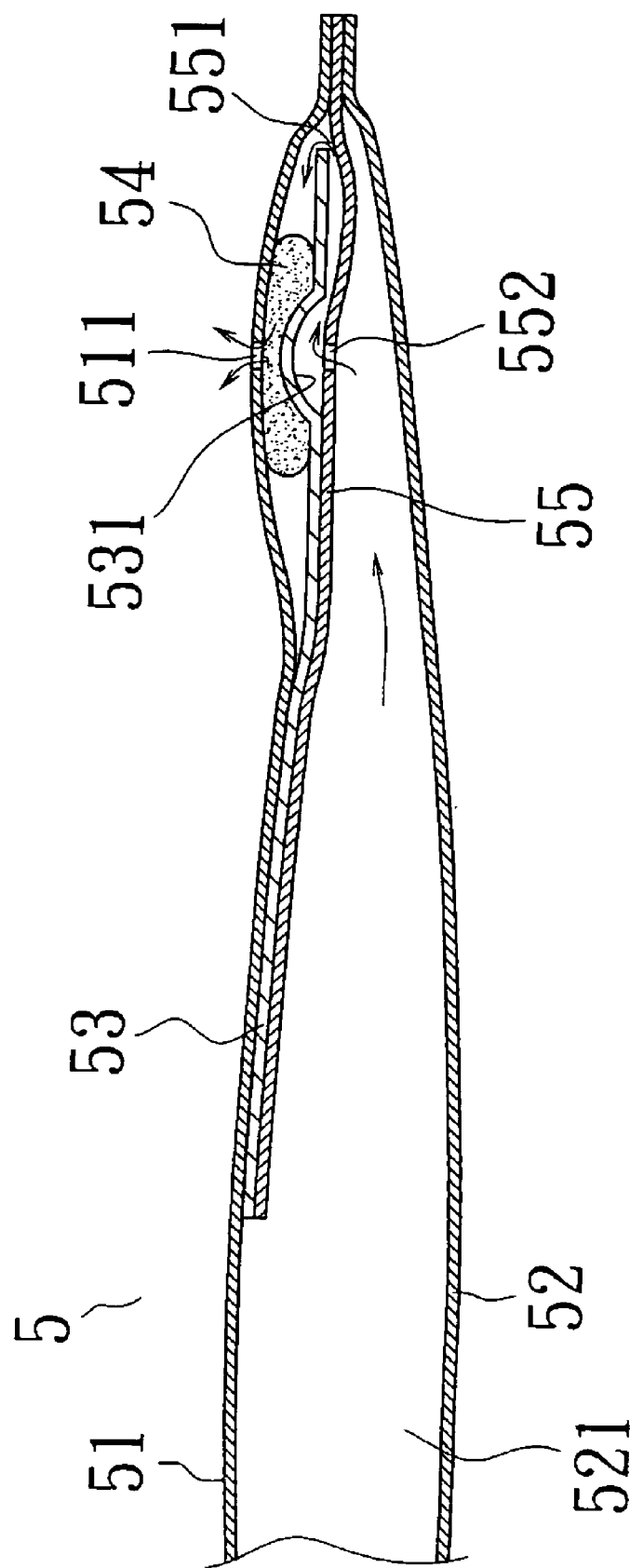
FIG. 6 is a view of the air cushion under an air-bleeding action.
Figure 7:
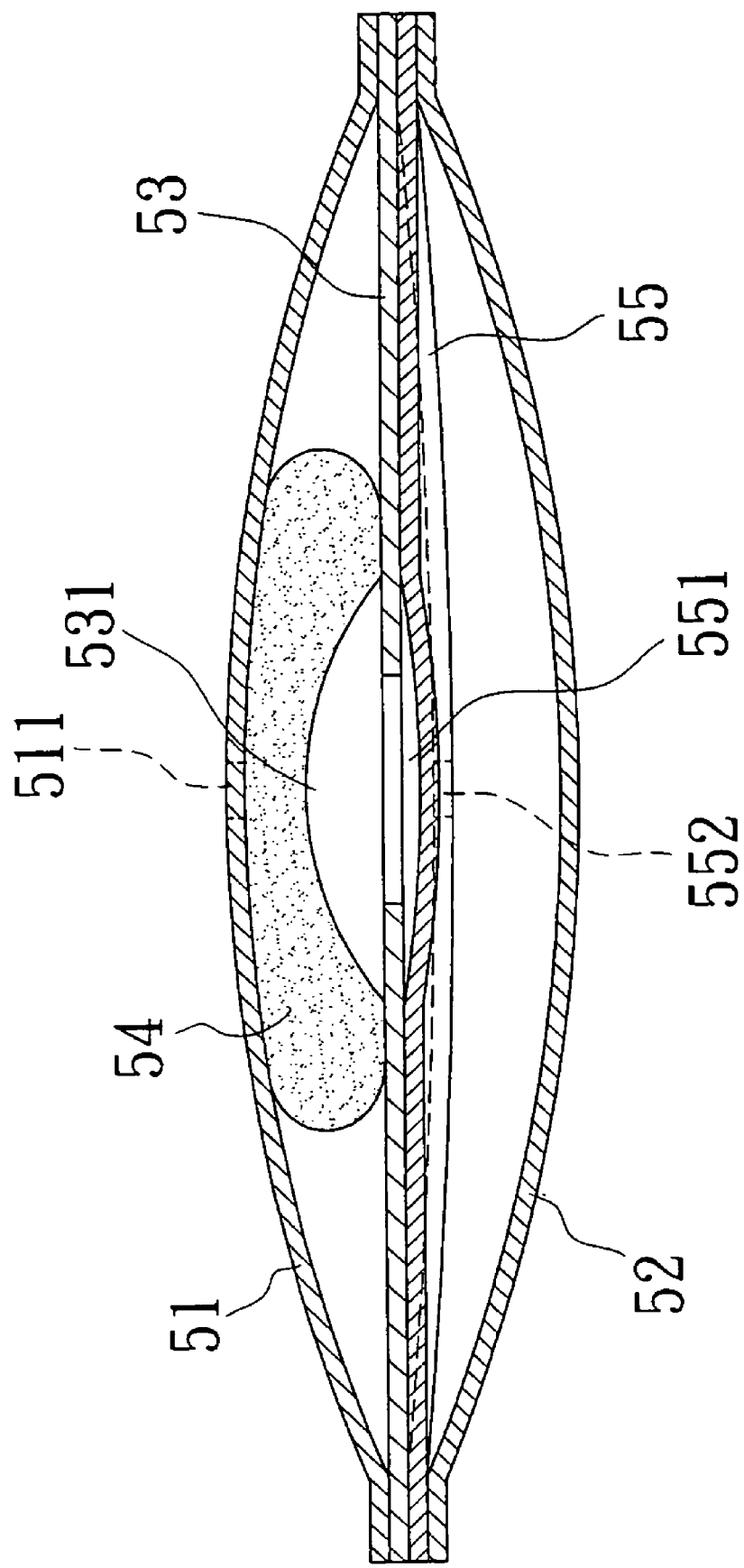
FIG. 7 is a partial sectional view of the air cushion under an air-bleeding action.

Air can be forced to flow out of the air cushion 5 when the air cushion 5 contains too much air. Referring to FIGS. 6 and 7, first the user moves the elastic plate 53 so as to make the displaceable portion 531 faces downwards; thus, the third plastic sheet 55 is no longer closely in contact with the elastic plate 53, and the through hole 552 is opened. Therefore, air in the air receiving space 521 will flow out through the through hole 552, the displaceable portion 531, the air outlet hole 551 between the elastic plate 53 and the third plastic sheet 55, and the air inlet hole 511 of the first plastic sheet 51.

From the above description, it can be seen that the brassiere cup of the present invention has the following advantages:

1. The cup can lift the wearer's breast, and make it look perky because it has the air cushion.

2. The air cushion held in the cup can be inflated by means of repeatedly squeezing the air cushion. Therefore, one can easily make the air cushion contain sufficient amount of air to lift her breast and make it look perky when she is wearing the bra.

3. Air can be forced to flow out of the air cushion when the air cushion contains too much air or before the user washes the bra. Therefore, the bra of the present invention has a smoothly curved shape, not having the same drawback as the prior art, which can't be bled, and will form raised lines on its surface to spoil the contour of the wearer's breast if its air cushion is over-inflated.

What is claimed is:

1. A pressable air cushion capable of being inflated and bled, comprising
   a first plastic sheet; the first plastic sheet having an air inlet hole;
   a second plastic sheet; the first and the second plastic sheets being joined together at peripheries thereof to form an air receiving space therebetween;
   an elastic plate interposed between the first and the second plastic sheets; the elastic plate having a displaceable portion capable of changing shape between concave and convex contours; the elastic plate being joined at a first end thereof to the first plastic sheet by heat-sealing so that an air passage is formed between the elastic plate and the first plastic sheet to allow air to flow into the air receiving space therethrough;
   a compressible component interposed between the air inlet hole of the first plastic sheet and the displaceable portion of the elastic plate; and
   a third plastic sheet; the third plastic sheet and the elastic plate being joined together at peripheries thereof with an air outlet hole being formed therebetween; the third plastic sheet being larger than the elastic plate; the third plastic sheet having a through hole disposed in correspondence with the displaceable portion of the elastic plate.

2. The pressable air cushion capable of being inflated and bled as claimed in claim 1, wherein the compressible component is a sponge.

3. The pressable air cushion capable of being inflated and bled as claimed in claim 1, wherein the compressible component is a foam material.

4. The pressable air cushion capable of being inflated and bled as claimed in claim 1, wherein the compressible component is made of a material formed of elastic fibers.

5. The pressable air cushion capable of being inflated and bled as claimed in claim 1, wherein the compressible component is a piece of rubber.

6. A brassiere cup with a pressable air cushion capable of being inflated and bled, comprising
   inner and outer cotton layers;
   inner and outer foam layers positioned between the inner and the outer cotton layers;
   the pressable air cushion being positioned between and covered with the inner and the outer foam layers; the pressable air cushion comprising:
      a first plastic sheet; the first plastic sheet having an air inlet hole; the inner foam layer having a through hole; the inner cotton layer having a through hole, which is disposed in correspondence with the through hole of the inner foam layer; the air inlet hole of the first plastic sheet being exposed through the through holes of the inner foam layer and the inner cotton layer;
      a second plastic sheet; the first and the second plastic sheets being joined together at peripheries thereof to form an air receiving space therebetween;
      an elastic plate interposed between the first and the second plastic sheets; the elastic plate having a displaceable portion capable of changing shape between concave and convex contours; the elastic plate being joined at a first end thereof to the first plastic sheet by heat-sealing so that an air passage is formed between the elastic plate and the first plastic sheet to allow air to flow into the air receiving space therethrough;
      a compressible component interposed between the air inlet hole of the first plastic sheet and the displaceable portion of the elastic plate; and
      a third plastic sheet; the third plastic sheet and the elastic plate being joined together at peripheries thereof with an air outlet hole being formed therebetween; the third plastic sheet being larger than the elastic plate; the third plastic sheet having a through hole disposed in correspondence with the displaceable portion of the elastic plate.

7. The brassiere cup with a pressable air cushion capable of being inflated and bled as claimed in claim 6, wherein the compressible component is a sponge.

8. The brassiere cup with a pressable air cushion capable of being inflated and bled as claimed in claim 6, wherein the compressible component is a of foam material.

9. The brassiere cup with a pressable air cushion capable of being inflated and bled as claimed in claim 6, wherein the compressible component is made of a material formed of elastic fibers.

10. The brassiere cup with a pressable air cushion capable of being inflated and bled as claimed in claim 6, wherein the compressible component is a piece of rubber.

11. The brassiere cup with a pressable air cushion capable of being inflated and bled as claimed in claim 6, wherein the inner cotton layer has a sticky adhesive film, which covers the air inlet hole.

* * * * *